United States Patent
Eisenhut et al.

(10) Patent No.: US 9,616,911 B2
(45) Date of Patent: Apr. 11, 2017

(54) CLEANING CART (71) Applicant: CARL FREUDENBERG KG, Weinheim (DE)

(72) Inventors: Andreas Eisenhut, Pullach (DE); Christoph Zimmermann, Weinheim (DE); Bruno Meier, Untersiggenthal (CH)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 14/786,546

(22) PCT Filed: Apr. 16, 2014

(86) PCT No.: PCT/EP2014/001019
§ 371 (c)(1),
(2) Date: Oct. 23, 2015

(87) PCT Pub. No.: WO2014/173508
PCT Pub. Date: Oct. 30, 2014

(65) Prior Publication Data
US 2016/0082998 A1 Mar. 24, 2016

(30) Foreign Application Priority Data
Apr. 24, 2013 (DE) .................. 10 2013 007 041

(51) Int. Cl.
*B62B 3/04* (2006.01)
*B62B 3/10* (2006.01)
*A47L 13/51* (2006.01)

(52) U.S. Cl.
CPC ............... *B62B 3/04* (2013.01); *A47L 13/51* (2013.01); *B62B 3/10* (2013.01); *B62B 2202/50* (2013.01); *B62B 2501/00* (2013.01)

(58) Field of Classification Search
None
See application file for complete search history.

(56) References Cited

U.S. PATENT DOCUMENTS 2,311,422 A * 2/1943 Walling ................. B62B 3/106
211/1
2,596,749 A * 5/1952 Webber .................... B62B 3/10
15/257.01
(Continued)

FOREIGN PATENT DOCUMENTS

DE 4443535 A 6/1996
DE 60022261 T2 6/2006
(Continued)

*Primary Examiner* — John Walters
*Assistant Examiner* — Hilary L Johns
(74) *Attorney, Agent, or Firm* — Leydig, Voit & Mayer, Ltd.

(57) ABSTRACT

A cleaning cart having a base plate and a working plate arranged at a vertical distance above the base plate, the base plate and the working plate being connected to each other by a rod system arranged within the vertical distance. The rod system is formed by at least two struts extending in a non-parallel manner relative to each other, and the struts are connected to each other by a bridge-like holder, the holder being arranged in a self-retaining manner between the struts.

34 Claims, 8 Drawing Sheets (56) References Cited

U.S. PATENT DOCUMENTS

| | | | | |
|---|---|---|---|---|
| 2,833,550 A * | 5/1958 | Frick | B62B 3/02 | 280/47.34 |
| 4,555,124 A * | 11/1985 | Millington | B62B 5/002 | 280/288.4 |
| 4,923,202 A * | 5/1990 | Breveglieri | B62B 3/10 | 108/107 |
| 5,000,210 A * | 3/1991 | Worthington, Jr. | A47C 7/66 | 135/90 |
| 5,086,960 A * | 2/1992 | Schwietzer | B62B 3/1428 | 224/277 |
| D351,738 S * | 10/1994 | LaCombe | B62B 3/1428 | D12/416 |
| 5,497,926 A * | 3/1996 | Rittenhouse | A61G 5/10 | 224/407 |
| 5,887,878 A * | 3/1999 | Tisbo | B62B 1/20 | 280/47.19 |
| D435,196 S * | 12/2000 | Gregor | B62B 3/1428 | D12/420 |
| 6,220,184 B1 * | 4/2001 | Sack | A47B 11/00 | 108/139 |
| 6,260,865 B1 * | 7/2001 | Yacobi | B62B 1/262 | 248/346.01 |
| 6,398,235 B1 * | 6/2002 | Cary | B25H 3/00 | 280/47.18 |
| 6,497,423 B1 * | 12/2002 | Perelli | B62B 3/10 | 280/47.34 |
| 6,669,214 B1 * | 12/2003 | Domis | B25H 3/00 | 280/47.19 |
| 6,688,615 B2 * | 2/2004 | Chen | A47G 23/0225 | 280/47.35 |
| 6,981,707 B1 * | 1/2006 | Dandy | B62B 5/06 | 150/154 |
| 7,055,847 B2 * | 6/2006 | Miller | B62B 3/022 | 248/161 |
| 7,168,714 B2 * | 1/2007 | Gibbs | A01B 1/00 | 280/47.26 |
| 7,226,126 B1 * | 6/2007 | Spanovich | A47C 4/286 | 135/96 |
| 7,506,770 B2 * | 3/2009 | Rief | A47L 9/0009 | 211/70.6 |
| 8,056,909 B2 * | 11/2011 | Burdwood | B62B 3/1404 | 280/33.991 |
| 8,313,114 B1 * | 11/2012 | Aron | B62B 3/1472 | 280/33.991 |
| 8,342,544 B1 * | 1/2013 | Blewett | B62B 3/022 | 211/189 |
| 8,419,024 B1 * | 4/2013 | Arroyo-Ferrer | B62B 3/005 | 280/47.35 |
| 8,973,928 B2 * | 3/2015 | Mellinger | B62B 9/26 | 224/409 |
| 2007/0177925 A1 * | 8/2007 | Perelli | A47L 13/22 | 401/48 |
| 2008/0143069 A1 * | 6/2008 | Richards | A47F 5/135 | 280/47.35 |
| 2008/0238012 A1 * | 10/2008 | Carter | B62B 3/02 | 280/47.35 |
| 2009/0026732 A1 * | 1/2009 | Lindner | B62B 3/008 | 280/638 |
| 2010/0072715 A1 * | 3/2010 | Crum | B62B 3/1408 | 280/33.992 |
| 2012/0097721 A1 * | 4/2012 | Winterhalter | B60N 3/10 | 224/409 |
| 2014/0217690 A1 * | 8/2014 | Schumaker | B62B 3/005 | 280/47.35 |
| 2016/0068178 A1 * | 3/2016 | Eisenhut | A47L 13/51 | 280/47.35 |
| 2016/0082998 A1 * | 3/2016 | Eisenhut | A47L 13/51 | 280/47.35 |

FOREIGN PATENT DOCUMENTS

| | | |
|---|---|---|
| EP | 1055581 A1 | 11/2000 |
| EP | 2427174 A | 11/2000 |

* cited by examiner

CLEANING CART

CROSS-REFERENCE TO RELATED APPLICATIONS

This application is a U.S. national stage application under 35 U.S.C. §371 of International Application No. PCT/EP2014/001019, filed on Apr. 16, 2014, and claims benefit to German Patent Application No. DE 10 2013 007 041.4, filed on Apr. 24, 2013. The International Application was published in German on Oct. 30, 2014, as WO 2014/173508 A1 under PCT Article 21(2).

FIELD

The invention relates to a cleaning cart, comprising a base plate and a working plate arranged at a vertical distance above the base plate, wherein the base plate and the working plate are connected to each other by a linkage arranged within the vertical distance.

BACKGROUND

Such cleaning carts are known in general and are frequently used by commercially active cleaning firms, for example for cleaning office stories. Cleaning utensils, such as buckets, cleaning cloths, refuse bins and/or surface cleaning appliances, are accommodated in the cleaning cart or are fastened thereto.

In order to be able to accommodate all of the cleaning utensils, the previously known cleaning carts have large dimensions, wherein, despite the large dimensions, cleaning utensils are frequently fastened to the cleaning cart on the outside and protrude over the edge-side boundary of the cleaning cart, and therefore the cleaning cart thereby becomes even more unwieldy and there is the risk that, for example, walls or furniture will be damaged by the cleaning utensils hanging on the outside of the cleaning cart, or that cleaning utensils will drop off the cleaning cart.

SUMMARY

An aspect of the invention provides a cleaning cart, comprising: a base plate; and a working plate arranged at a vertical distance above the base plate, wherein the base plate and the working plate are connected to each other by a linkage arranged within the vertical distance, wherein the linkage includes a first and a second strut, extending in a non-parallel manner with respect to each other, wherein the first and second struts are connected to each other by a holder of rack-shaped design, and wherein the holder is arranged in a self-locking manner between the first and second struts.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An aspect of the invention relates to a cleaning cart, comprising a base plate and a working plate arranged at a vertical distance above the base plate, wherein the base plate and the working plate are connected to each other by a linkage arranged within the vertical distance.

An aspect of the invention is based on further developing a cleaning cart of the previously mentioned type in such a manner that said cleaning cart has more compact dimensions, is thereby more manageable and can be used in smaller spaces, and that cleaning utensils are arranged as required in and/or on the cleaning cart in such a manner that said cleaning utensils do not protrude over the edge-side boundary of the cleaning cart.

An aspect of the invention provides that the linkage is formed by at least two struts extending non-parallel with respect to each other, that the struts are connected to each other by a holder of rack-shaped design, and that the holder is arranged in a self-locking manner between the bridges.

The space between the base plate and the working plate is frequently used in order to be able to accommodate cleaning utensils, such as, for example, buckets, cleaning cloths, refuse bins and/or surface cleaning appliances, there. However, the size of said space is generally restricted by the linkage by means of which the base plate is connected to the working plate. However, it is important in this connection that the lateral axis to the cleaning utensils which are transported by the cleaning cart is possible in a simple manner. For example, a long-handled floor cleaning appliance should be able to be easily removed from the cleaning cart and attached thereto again after use.

The restriction of the available space is minimized, according to the invention, in that the at least two struts, by means of which the base plate is connected to the working plate, extend non-parallel to each other. As a result, additional space is obtained which can be used for accommodating cleaning utensils. By means of the non-parallel extension of the struts relative to each other, the struts are arranged on the end side on one side adjacent to each other at a smaller distance and on the end side on the other side at a larger distance. On the end side on one side, the ends of the struts are therefore closer together, and therefore there is thereby more space available for the circumferential-side boundary of the corresponding plate in which the end sides of the struts located relatively close together are arranged.

The struts are connected to each other by a holder of rack-shaped design, wherein the holder is arranged in a self-locking manner between the bridges. The holder of rack-shaped design primarily has the object, as receiving device, of accommodating additional cleaning utensils within the vertical distance between base plate and working plate. Such cleaning utensils can be formed, for example, by cleaning cloths, mop covers or buckets which are suspended on the holder. In addition, the holder can accommodate an additional plane, hooks or shelves for cleaning utensils.

Owing to the fact that the holder is arranged between the struts extending non-parallel to each other, the holder is held in a self-locking manner in the vertical direction between the bridges. This self-locking is achieved in that the holder is wedged between the struts. The more heavily the holder is loaded, the greater the wedge effect. Separate fastening devices for securing the holder, such as, for example, screws, are therefore not required.

In addition, the holder has a positive influence on the stability of the cleaning cart. In the majority of applications, the holder is arranged in the central third of the struts, as viewed in the vertical direction. As a result of the fact that the holder braces the struts in relation to each other, the stability of the cleaning cart is increased.

The struts can each be connected at a first end-side end to a first fastening region of the base plate, and each at a second end-side end to a second fastening region of the working plate. The lower the number of struts and the more delicate the design of the latter, the greater is the remaining space in which cleaning utensils can be accommodated and transported. Secondly, a cleaning cart, in particular if used commercially, has to have sufficiently great stability and be of sturdy design such that said cleaning cart has consistently good use properties, for example simple loadability with cleaning utensils and unloadability of same, and good steerability, during a long service life.

For this stability and durability, only one strut, by means of which the working plate is supported on the base plate, is not sufficient. Even two struts which extend parallel to each other, are very close together and connect the respective centers of base plate and working plate, are not very satisfactory with regard to sufficient stability of the cleaning cart, in particular stable support of the working plate on the base plate.

The first fastening region has a first area and the second fastening region has a second area, wherein the first area is smaller than the second area or the second area is smaller than the first area. The fastening region with the smaller area is always part of the plate which is intended to have more space for accommodating the cleaning utensils. If, for example, space is required on the base plate in order, within the circumferential-side boundary of the base plate, to be able to deposit a flat mop, the upper handle section of which is held, for example, on the working plate, the first fastening region has a relatively small first area such that sufficient space for depositing the flat mop remains next to said relatively small first area.

If, by contrast, it is desirable for there to be as large a space as possible under the working plate in order, for example, to be able to fasten cleaning cloths and/or covers under the working plate, or to be able to hang small buckets under the working plate in such a manner that said buckets do not protrude beyond the circumferential-side boundary of the working plate, the second fastening region has a relatively smaller second area.

Accordingly, the first end-side ends of the struts can be at a first distance from each other, and the second end-side ends of the struts can be at a second distance, wherein the first distance or the second distance is smaller than the second distance or the first distance. By means of the distances of differing size, the stability of the cleaning cart, in particular the stability with which the working plate is connected to the base plate, is increased with respect to a design in which the struts are arranged parallel and at a smaller distance from each other.

The struts can be arranged trapezoidally with respect to each other, transversely with respect to a main travel direction of the cleaning cart. The struts would then be arranged symmetrically with respect to an imaginary vertical plane which is arranged in the main travel direction. Said trapezoidal or V-shaped arrangement of the struts firstly brings about good stability of the cleaning cart, in particular transversely with respect to the main travel direction, and secondly space is created for cleaning utensils transversely with respect to the main travel direction on both sides of the imaginary plane. The entire cleaning cart can thereby be formed substantially symmetrically with respect to the imaginary plane.

If, for example, space for accommodating cleaning utensils is required only on one side of the imaginary plane transversely with respect to the main travel direction, but said space is relatively larger than in the case of the previously described, symmetrical arrangement of the struts, there is the possibility of arranging one of the struts vertically between the base plate and the working plate, i.e. parallel to the imaginary plane, and the other strut at an inclination of respect thereto such that more space is produced for accommodating cleaning utensils by means of the struts which firstly stand closer together on the end sides and the small fastening region resulting therefrom.

The base plate and/or the working plate can have recesses for accommodating the corresponding end-side ends of the struts, wherein the recesses and the end-side ends of the struts are designed congruently. By means of such a configuration, the connection of the base plate to the working plate by means of the struts has proven particularly simple and stable. The cleaning cart can be assembled in a simple manner without tools by the struts being placed into the recesses of base plate and working plate. The cleaning cart can thereby be assembled and disassembled particularly simply and rapidly. Such a time saving is of advantage, which should be emphasized, especially in the case of commercial use.

The end-side ends can be arranged in a frictional manner in the respective recesses.

If the end-side ends are clamped into the respective recesses during the assembly of the cleaning cart, said clamping can be achieved, for example, by the fact that the struts are held in the recesses by a transition fit or an easy interference fit, or, for example, by the fact that the end-side ends are wedged together with the recesses by means of separately produced insertion wedges.

In general, a non-integrally-bonded connection of the struts in the respective recesses is of advantage. As a result, the cleaning cart can easily be assembled or disassembled at any time.

In addition to the frictional connection, the connection can be configured in a form-fitting manner, for example by the fact that the end-side ends are additionally held in the respective recesses by transverse catches, snap hooks or else screw connections.

With regard to simple and cost-effective producibility of the cleaning cart and with regard to an assembly which is as simple as possible, it can preferably be provided for all of the struts to be designed as identical parts.

The struts can each have a profile which is closed in the circumferential direction and does not have undercuts. As a result, the cleaning cart can easily be kept clean because the struts can also be cleaned simply and thoroughly. As a result, there are not any dirty corners as may arise, for example, in the case of open profiles.

Furthermore preferably, the struts can be composed of an extruded or welded profile which can be produced particularly simply and cost-effectively in the form of cut goods.

The struts can preferably have a cross section differing from the circular shape. It is of advantage in this case that, for example, additional holders for receiving further cleaning utensils can be clipped onto the non-circular profile, wherein the holders are then held on the struts in a manner secured against rotation without additional measures.

The struts can have an elliptical cross section, with a respective main axis which extends substantially in the main travel direction of the cleaning cart. Owing to the fact that the struts each have a main axis which is relatively longer in the main travel direction with respect to the secondary axis, which extends transversely with respect to the main travel direction and is relatively shorter, the stability of the cleaning cart in the main travel direction is particularly great. The risk of a possible deformation of the struts during acceleration or braking of the cleaning cart in or counter to the main travel direction is thereby reduced to a minimum. The struts have particularly great rigidity in the main travel direction while having a low dead weight.

The main axes of the struts arranged trapezoidally with respect to each other can be arranged converging with respect to each other in the main travel direction. Together with recesses of corresponding design in the fastening regions of base plate and working plate, it is thereby ensured that the base plate and the working plate can only be assembled in a positionally correct manner with respect to each other. If the assembler of the cleaning cart attempts, for example, to connect the working plate in a manner offset by 180° to the base plate, the struts would not be able to be introduced into the second fastening region of the working plate. Assembly reliability is achieved by means of the converging arrangement.

The main axes can enclose an angle of 2° to 45°, preferably 10° to 15°, in the main travel direction, wherein, according to definition, the main axes of the struts then also extend substantially in the main travel direction of the cleaning cart. By means of such an angle, a good compromise is achieved between stability of the struts in the main travel direction, on the one hand, and assembly reliability, on the other hand.

The recesses can have a depth, wherein the ratio of the depth of the recesses, in which the corresponding struts are accommodated, to the length of the main axis of the accommodated struts is ideally 1 to 3. The stability of the cleaning cart is also assisted by means of these features. Owing to the struts being accommodated on the end sides in the recesses at least in each case to the extent of the length of main axis of the struts, the struts are sufficiently readily guided both in the base plate and in the working plate. Further measures for improving the durability of the cleaning cart, for example additional diagonal members, which would also take up construction space undesirably again, are therefore not required.

The base plate and the working plate respectively have an outer boundary. For many applications, it is proven advantageous if both the base plate and the working plate are of substantially rectangular design.

The holder can be arranged substantially parallel to the base plate and to the working plate. By means of this parallel arrangement, the handling of the cleaning cart, in particular the accessibility of the holder, is simplified. In addition, the mutual support of the struts by the holder and, as a result, the stability of the cleaning cart, is particularly good because of such an arrangement.

The holder can have a respective holding clip on the end sides on both sides, with which said holder is secured on the corresponding struts. By means of the self-locking of the holder between the struts, the holder can be connected to the struts by means of the holding clips in a particularly simple manner.

The holding clips can each have two half shells which are connected to each other by means of a joint, wherein the half shells together enclose the corresponding webs in a manner bearing thereagainst on the outer circumferential side. At the end facing away from the joint, the half shells can have corresponding latching lugs which are latchable to each other in order to assemble the holder between the struts without a tool.

If the struts, as previously described, have a cross section differing from the circular shape, a positionally correct positioning of the holder between the struts is produced automatically.

The joint can be formed by a film hinge. The holding clips can thereby be produced particularly cost-effectively and simply. For example, the holding clips can be composed of a polymeric material, wherein the two half shells and the joint formed as a film hinge are formed so as to merge integrally in each other and from the same material.

The holder can comprise receiving devices for cleaning utensils. Such receiving devices can be connected in a frictional and/or form-fitting manner to the holder, wherein it has proven advantageous for many applications if the receiving devices are of hook-shaped design. It is possible for, for example, cleaning cloths, mop covers and buckets with handles to be fastened in a particularly simple manner to such receiving devices of hook-shaped design.

The holder and/or the holding clips and/or the receiving devices can be composed of a polymeric material. It is of advantage in this connection that the components composed of the polymeric material can be produced in a simple and cost-effective manner, have only a low weight and are stable in relation to all customary cleaning agents.

Working plate and base plate can be of identical or different size depending on the respective circumstances of the application. A larger base plate is provided, for example, if cleaning utensils are intended to be deposited on the base plate. Such a cleaning utensil can be formed by a flat mop. A relatively small first fastening region with a relatively small first area would then be provided on the relatively large base plate, wherein the first end-side ends of the struts are arranged at a small first distance from each other in the base plate.

If, by contrast, cleaning utensils, such as, for example, wiping cloth or bucket, are intended to be accommodated below the working plate on the side facing the base plate, the working plate is preferably designed to be larger than the base plate, and the second fastening region and the second area are smaller relative to the first fastening region and the first area, and therefore there is space for carrying said cleaning utensils next to the second end-side ends, which are arranged relatively close to each other at the second distance.

The relatively smaller first fastening region or second fastening region together with the outer boundary of the relatively larger base plate or working plate can bound a depositing area for at least one cleaning utensil.

The depositing area which arises by means of the arrangement according to the invention of the struts can have a width of at least 50 mm. Such a width is of advantage in order to be able to carry even flat mops, the width of which in the opened/erected state is preferably 100 mm, on the cleaning cart without the flat mop protruding over the largest circumferential-side boundary of the base plate.

On the side facing away from the working plate, the base plate can have wheels, wherein preferably use is made of four wheels, of which only the wheels which are in front in the travel direction are of steerable design. As a result, the cleaning cart is particularly readily maneuverable.

An exemplary embodiment of a cleaning cart according to the invention is explained in more detail below with reference to FIGS. 1 to 8.

Figure 1:
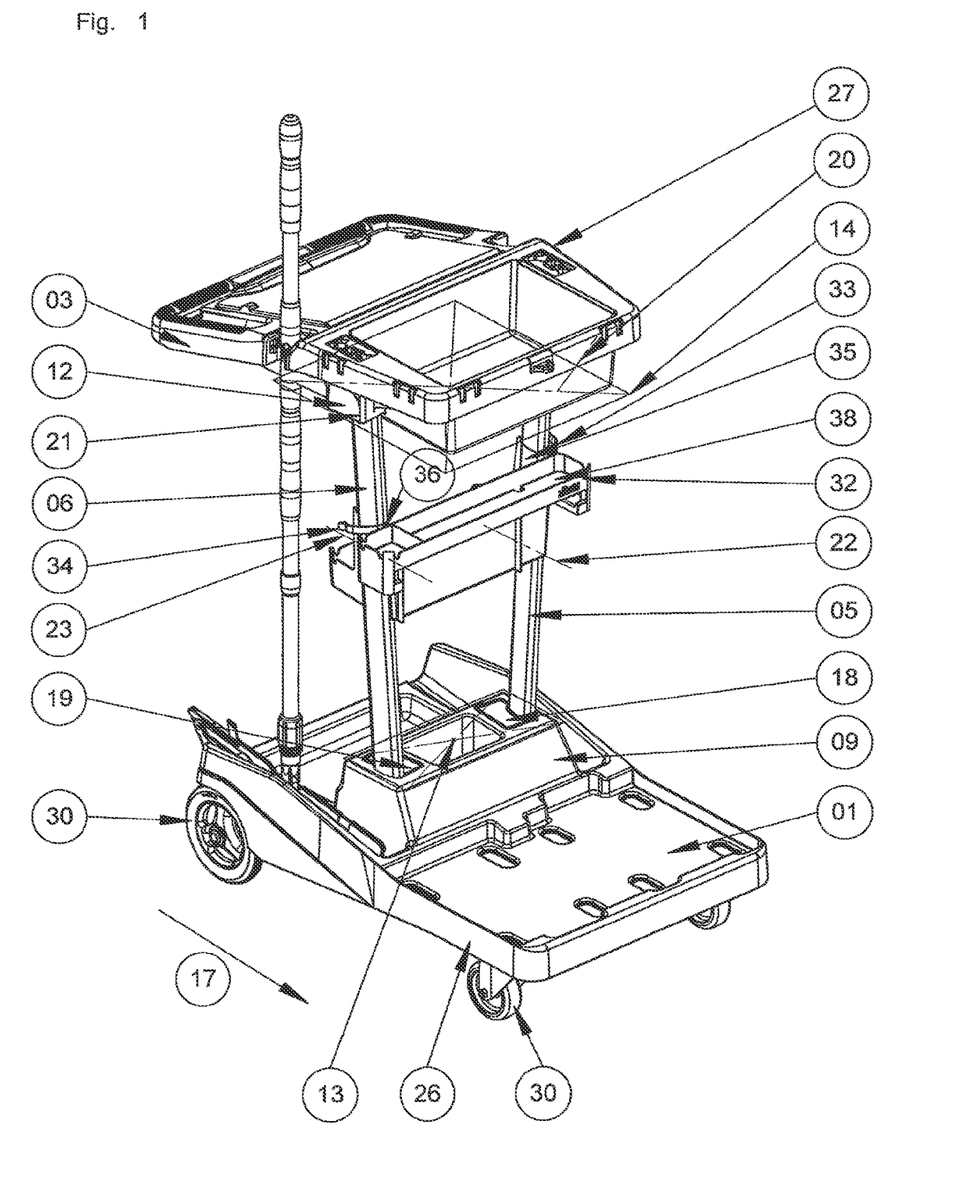
FIG. 1 a cleaning cart in a perspective view obliquely from the front and top.

FIG. 1 shows an exemplary embodiment of the cleaning cart according to the invention in a perspective illustration.

The cleaning cart comprises a base plate 1 which is of substantially rectangular design, wherein a wheel 30 is arranged in each corner on the lower side of the base plate 1. The wheels 30 arranged at the front in the main travel direction 17 are steerable, and the wheels 30 arranged at the rear in the main travel direction 17 are rigid.

On the upper side facing the working plate 3, the base plate 1 has a first fastening region 9, wherein the first fastening region 9 has a relatively small first area 13 with respect to the second area 14 of the second fastening region 12 of the working plate 3. The first fastening region 9 comprises the two recesses 18, 19 for receiving the first end-side ends 7, 8 of the struts 5, 6.

The working plate 3 has, on the lower side thereof, a second fastening region 12 in which the second end-side ends 10, 11 of the struts 5, 6 are accommodated. The second fastening region 12 has a second area 14 which is relatively larger than the first area 13 of the first fastening region 9 of the base plate 1.

In the exemplary embodiment illustrated here, the base plate 1 and the working plate 3 are connected to each other by the two struts 5, 6 which extend non-parallel with respect to each other and are arranged within the vertical distance 2 between the base plate 1 and the working plate 3. The struts 5, 6 form the linkage 4.

The struts 5, 6 are connected to each other by the holder 32 which is of rack-shaped design and is arranged in a self-locking manner between the webs 5, 6. In the exemplary embodiment shown here, the holder 32 extends parallel to the base plate 1 and to the working plate 3 and is fastened to the corresponding struts 5, 6 by holding clips 33, 34.

Each holding clip 33, 34 consists of two half shells 35, 36 which are connected in an articulated manner to each other by a joint 37 formed in the manner of a film hinge. At the end facing the joint, the respective half shells are latchable to each other without a tool by means of integrally formed latching lugs. The receiving devices 38 on the holder 32 can either be formed with the holder 32 so as to merge with one another integrally or can be produced separately, wherein the receiving devices 38 in the last-mentioned case are connected in a frictional and/or form-fitting manner to the holder 32. Wiping cloths, mop covers, buckets or other cleaning utensils can be fastened to the receiving devices.

The struts 5, 6 are designed as identical parts and have a closed elliptical cross section. The struts 5, 6 are connected here to the base plate 1 and the working plate 3 in such a manner that the main axes 22, 23 of the elliptical cross section of the struts 5, 6 extend in the main travel direction 17 of the cleaning cart, wherein the main axes 22, 23 together enclose an angle 24, 25 of approximately 7° in the main travel direction 17. As a result, the working plate 3 can only be connected in the correct position to the base plate 1. The only small angle 24, 25 enclosed by the main axes 22, 23 with each other is provided merely for assembly reliability.

Even in this view, it can be seen that the outer boundary 26 of the base plate 1 is larger than the outer boundary 27 of the working plate 3, and therefore a depositing area 28 for cleaning utensils, for a flat mop in the case shown here, is produced between the relatively smaller first fastening region 9 of the base plate 1 and the outer boundary 26. In the exemplary embodiment shown, the width 29 of the depositing area 28 is 100 mm.

The wiping surface of the flat mop is located completely within the outer boundary 26 of the base plate 1, and therefore no parts of the cleaning cart and/or of the cleaning utensils accommodated in/on the cleaning cart protrude over said outer boundary 26. The handle of the flat mop extends vertically from the base plate 1 in the direction of the working plate 3 and is fastened to the working plate 3, for example, by means of a clip.

In the exemplary embodiment shown here, the struts 5, 6 are arranged trapezoidally with respect to each other transversely with respect to the main travel direction 17 of the cleaning cart, to be precise, symmetrically with respect to an imaginary vertical plane 31 which extends in the main travel direction 17 of the cleaning cart; the struts 5, 6 are arranged symmetrically with respect to said plane 31. By means of the symmetrical arrangement of the struts 5, 6 with respect to the plane 31, depositing areas 28.1, 28.2 are produced on both sides on the upper side of the base plate 1 transversally with respect to the main travel direction 17.

However, in a departure therefrom, there is also the possibility of arranging the struts 5, 6 asymmetrically with respect to the plane 31.

Figure 2:
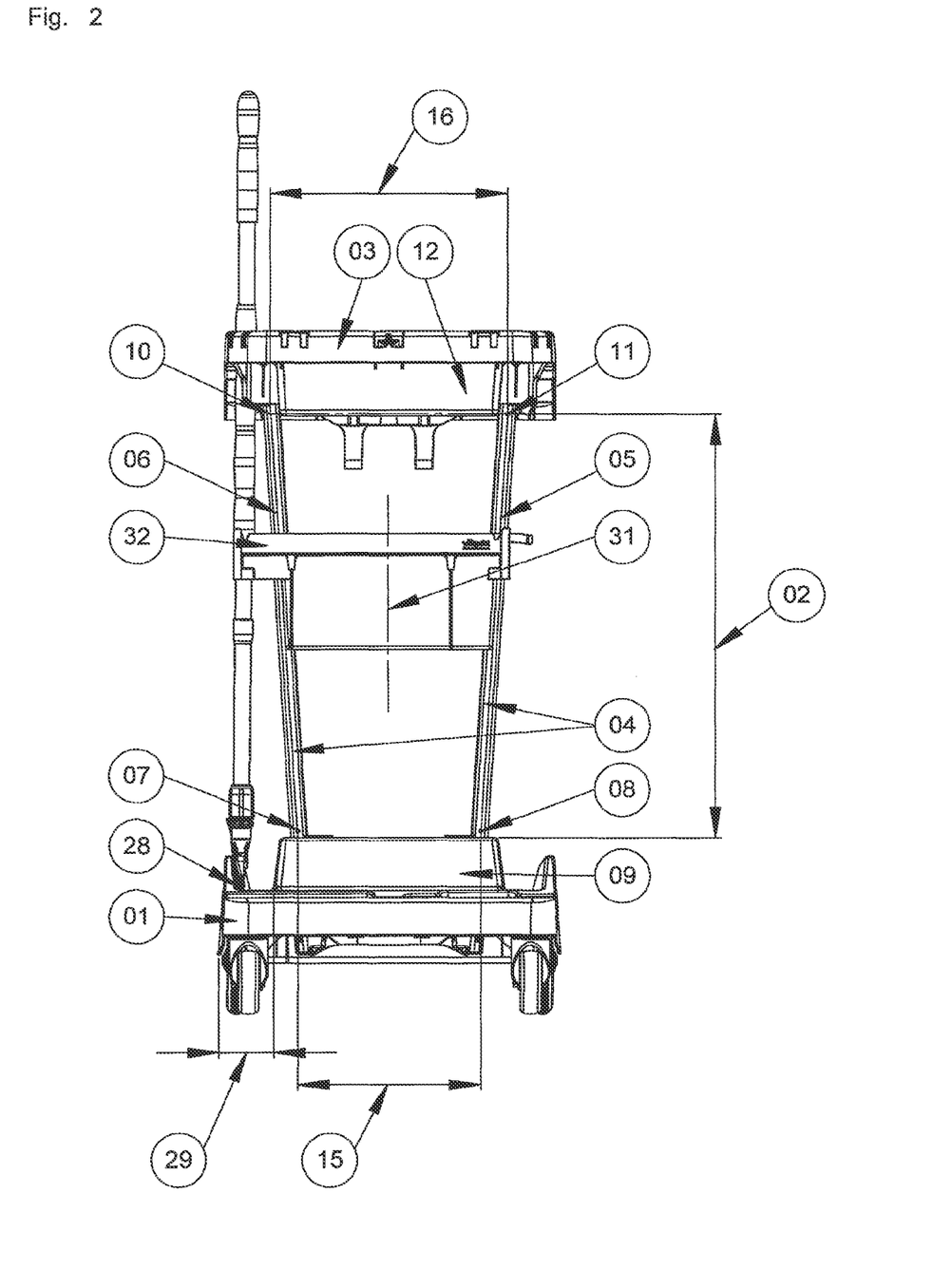
FIG. 2 shows a front view of a strut entering into use.
Figure 3:
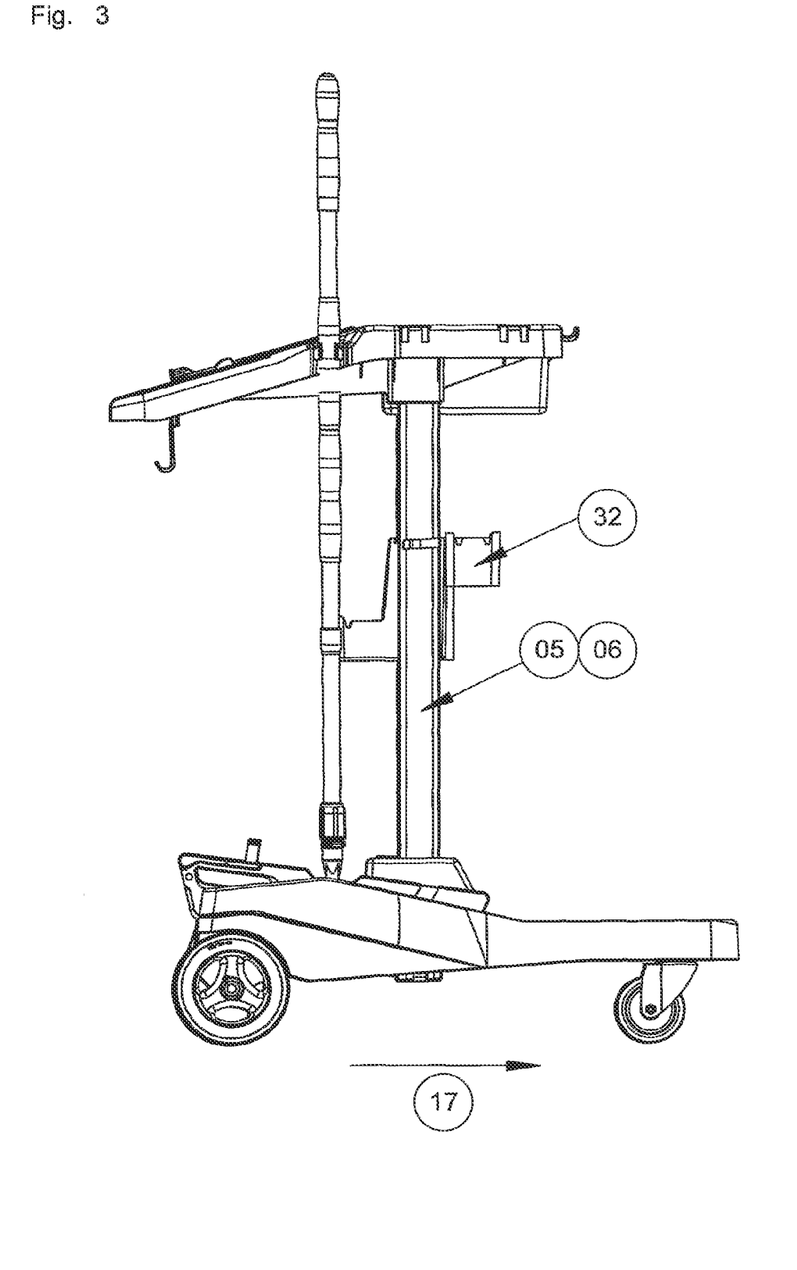
FIG. 3 shows a side view of the strut from FIG. 2.
Figure 4:
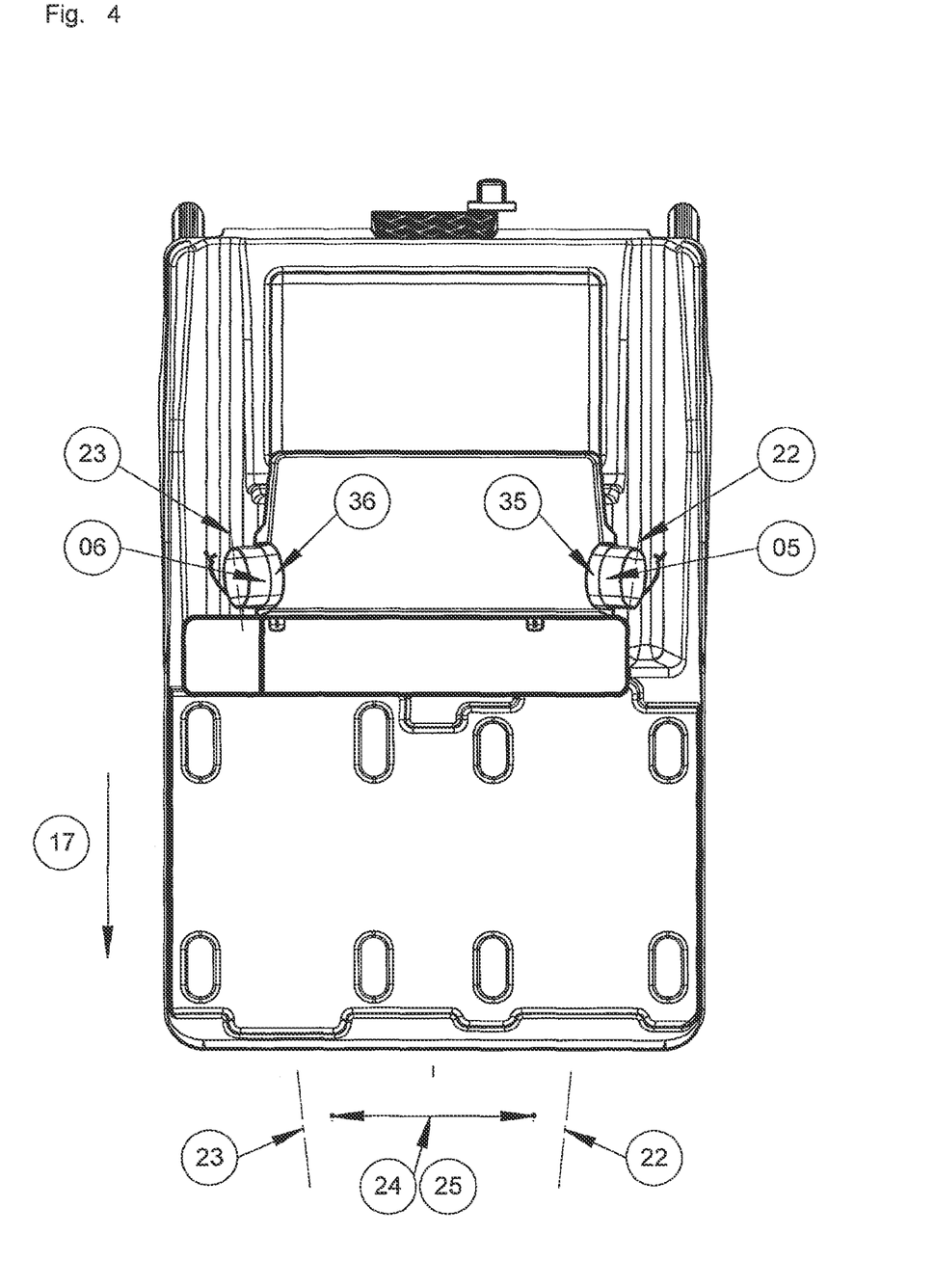
FIG. 4 shows a top view of the strut from FIGS. 2 and 3.

One of the struts 5, 6 is shown in FIGS. 2 to 4.

The strut 5, 6 shown is shown from the front in FIG. 2, from the side in FIG. 3 and from the top in FIG. 4.

The struts 5, 6 are designed as identical parts and have an elliptical cross section. In the installed state of the struts 5, 6, the main axis 22, 23 of the strut 5, 6 extends substantially in the main travel direction 17 of the cleaning cart, and therefore the support of the working plate 3 on the base plate 1 by means of the struts 5, 6 is particularly rigid especially in the main travel direction 17.

Figure 5:
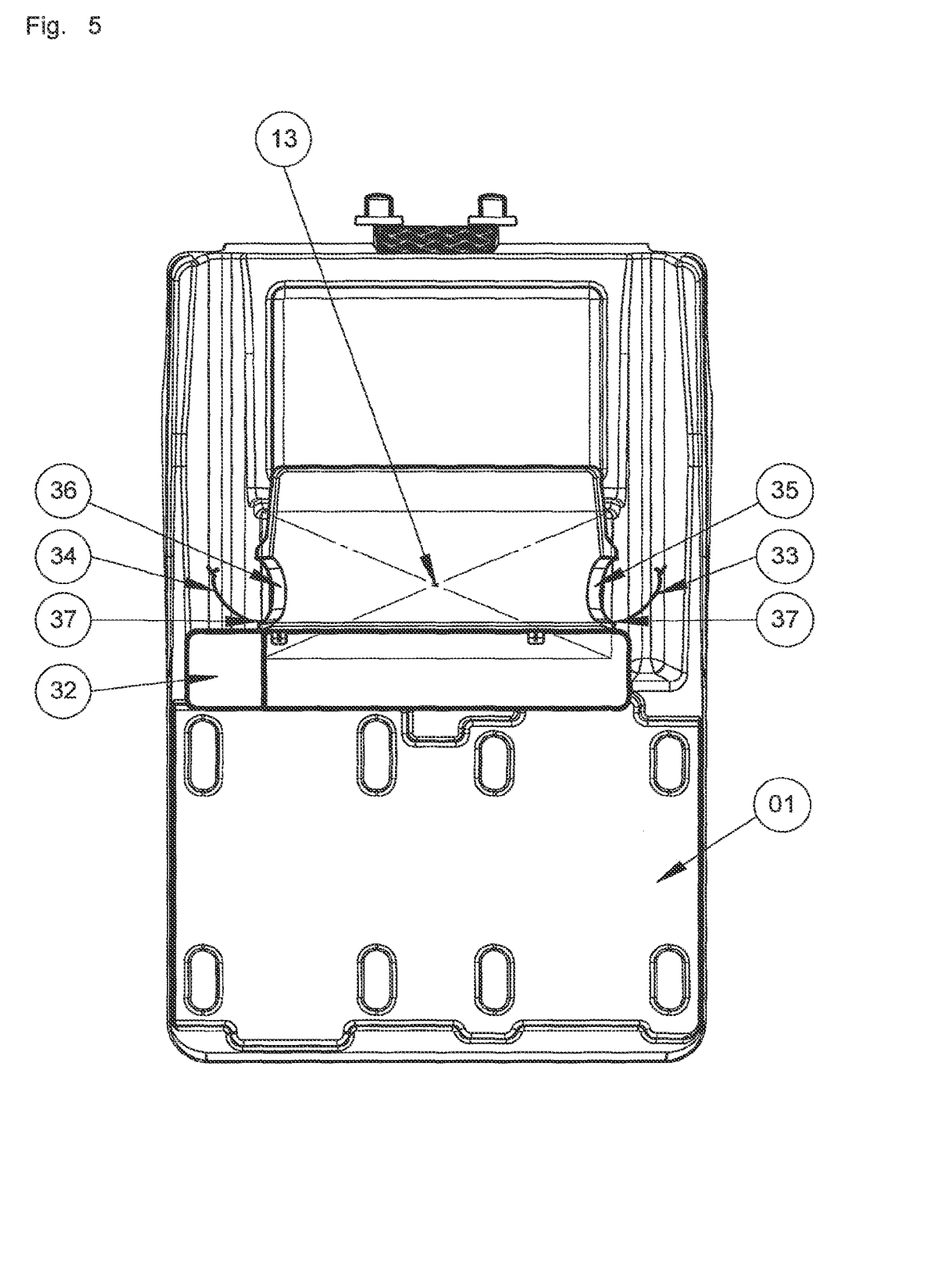
FIG. 5 shows the base plate as an individual part in a top view.

FIG. 5 shows the base plate 1 in a top view. The first fastening region 9, which has only a comparatively small first area 13, is located on the base plate 1. The first fastening region 9 comprises the recesses 18, 19, in which, in the assembled state of the cleaning cart, the first end-side ends 7, 8 of the struts 5, 6 are arranged. The depth of the recesses 18, 19 is at least the size of the length of the main axis 22, 23 of the struts 5, 6. The base plate 1 is composed overall of a polymeric material and is formed integrally.

Figure 6:
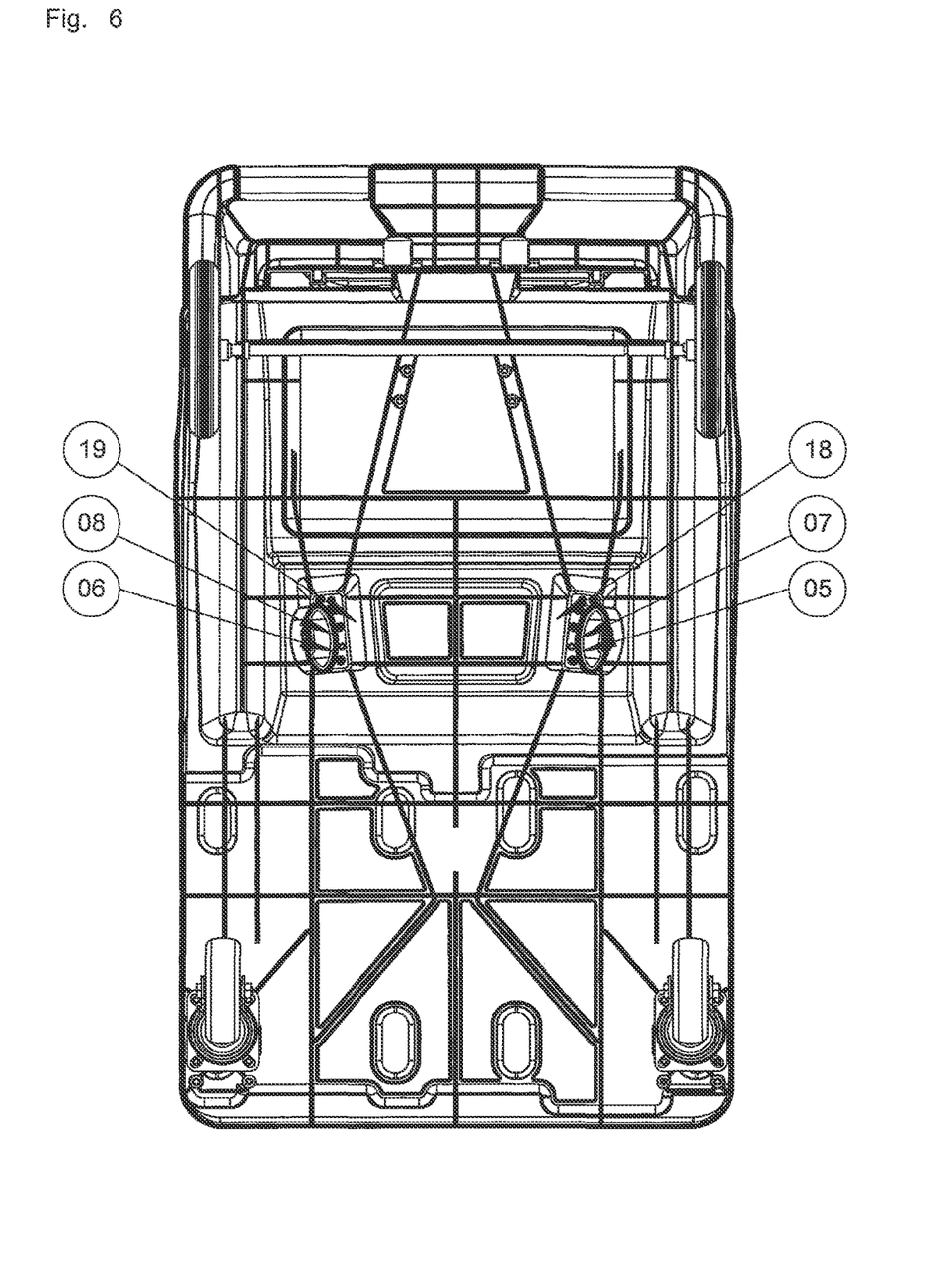
FIG. 6 shows the working plate in a view from below.

FIG. 6 shows the working plate 3 from below. The working plate 3 is also composed of a polymeric material and is formed integrally. On the lower side thereof facing the base plate 1, the working plate 3 has the second fastening region 12, with a second area 14 which is larger than the first area 13 of the first fastening region 9 of the base plate 1.

It can be seen in FIGS. 5 and 6 that the first end-side ends 7, 8 of the struts 5, 6 and therefore the recesses 18, 19 are at a first distance 15 from each other, and the second end-side ends 10, 11 and therefore recesses 20, 21 are at a second distance 16, wherein the first distance 15 is smaller because of the substantially trapezoidal arrangement of the struts 5, 6 than the second distance 16.

Figure 7:
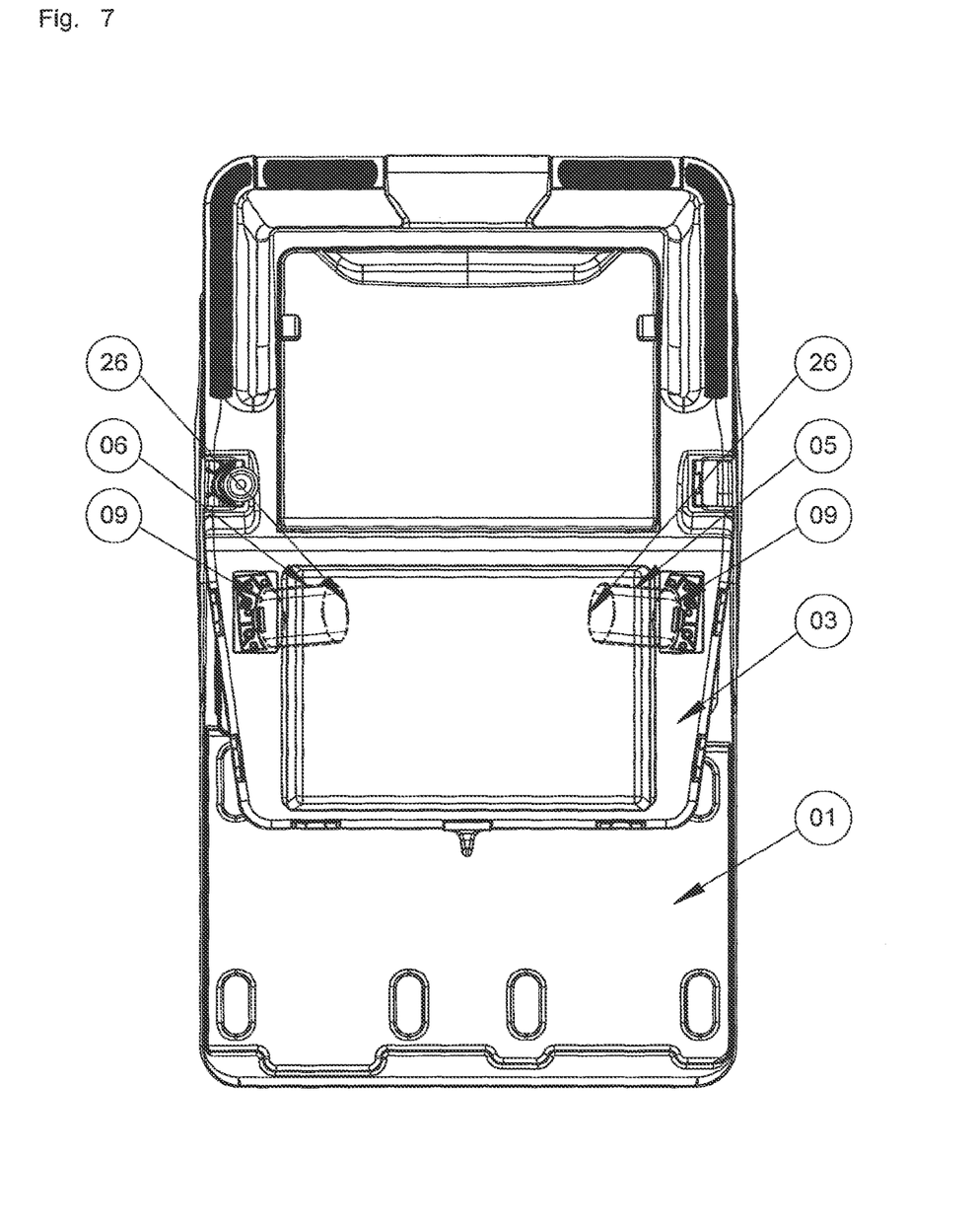
FIG. 7 shows a top view of the relatively smaller working plate which is mounted above the relatively larger base plate by means of the struts.

FIG. 7 shows a top view of the cleaning cart. It can be seen that the working plate 3 is smaller than the base plate 1. The struts 5, 6 and the first fastening region 9 are shown by dashed lines, wherein a respective depositing area 28.1, 28.2 is arranged between the first fastening region 9 and the outer boundary 26 of the base plate 1 transversely with respect to the main travel direction 17. A respective flat mop is supported on the depositing areas 28.1, 28.2.

No cleaning utensil and also no other component of the cleaning cart protrudes over the outer boundary 26 of the base plate 1, and therefore there is not the risk, even in confined spaces, that furniture or walls will be damaged by components protruding over the outer boundary 26.

Figure 8:
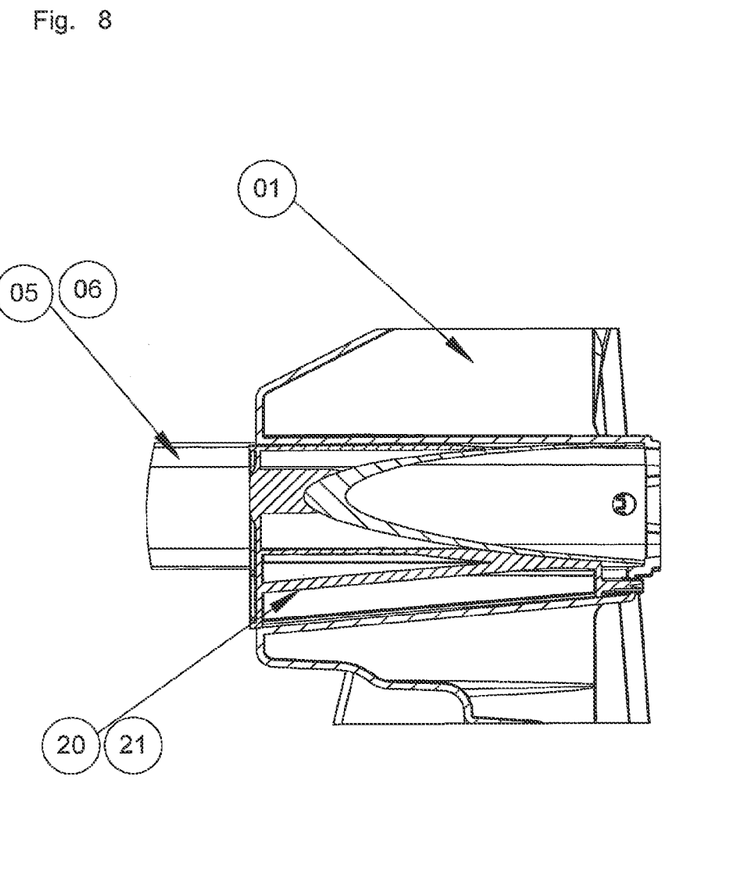
FIG. 8 shows a cutout from the base plate, wherein a strut is arranged in the recess.

FIG. 8 shows a cutout from the first fastening region 9 of the base plate 1. The recesses 18, 19 which, in the exemplary embodiment shown here, are formed congruently with respect to the first end-side end 7, 8 of the struts 5, 6, are arranged in the fastening region 9.

The depth of the recesses 18, 19 corresponds to the corresponding length of the main axes 22, 23 of the struts 5, 6. The relatively large overlap with which the struts 5, 6 are arranged in the recesses 18, 19 results in good stability of the cleaning cart and in the possibility of being able to mount the struts 5, 6 in the recesses 18, 19, 20, 21 without a tool.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A cleaning cart, comprising:
   a base plate;
   a working plate arranged at a vertical distance above the base plate; and
   a linkage connecting the base plate to the working plate, the linkage disposed within the vertical distance,
   wherein the linkage includes a first and a second strut, extending in a non-parallel manner with respect to each other,
   wherein the first and second struts are connected to each other by a rack-shaped holder, and
   wherein the holder is arranged in a self-locking manner, wedged between the first and second struts.

2. The cart of claim 1, wherein the struts are in each case connected at a first end-side end to a first fastening region of the base plate and in each case at a second end-side end to a second fastening region of the working plate.

3. The cart of claim 2, wherein the first fastening region includes a first area and the second fastening region includes a second area, and
   wherein the first area is smaller than the second area.

4. The cart of claim 2, wherein the first end-side ends of the struts are at a first distance from each other, and
   wherein the second end-side ends of the struts are at a second distance, and
   wherein the first distance is smaller than the second distance.

5. The cart of claim 1, wherein the struts are arranged trapezoidally with respect to each other, from a front and/or rear elevational view colinear with a main travel direction of the cleaning cart.

6. The cart of claim 1, wherein the end-side ends are arranged in a frictional and/or form-fitting manner in respective recesses of the base plate and/or of the working plate.

7. The cart of claim 1, wherein all of the struts are designed as identical parts.

8. The cart of claim 1, wherein the struts each have a profile which is closed in the circumferential direction and does not have undercuts.

9. The cart of claim 1, wherein the struts each have a cross section differing from the circular shape.

10. The cart of claim 1, wherein the struts have an elliptical profile, with a respective main axis which extends substantially in a main travel direction of the cleaning cart.

11. The cart of claim 10, wherein the main axes of the struts arranged trapezoidally with respect to each other are arranged converging with respect to each other downwardly, from a front elevational view colinear with the main travel direction.

12. The cart of claim 11, wherein the main axes enclose an angle of 2° to 45° in the main travel direction.

13. The cart of claim 6, wherein the recesses have a depth, and
   wherein a ratio of the depth of the recesses, in which corresponding struts are accommodated, to a length of the main axis of the struts is 1 to 3.

14. The cart of claim 1, wherein the base plate and the working plate respectively include an outer boundary.

15. The cart of claim 1, wherein the base plate is designed to be larger than the working plate, viewed perpendicular to a main travel direction of the cleaning cart.

16. The cart of claim 2, wherein a relatively smaller first fastening region together with an outer boundary of a relatively larger base plate bounds a depositing area for cleaning utensils.

17. The cart of claim 16, wherein the depositing area has a width of at least 50 mm.

18. The cart of claim 1, wherein the holder is arranged substantially parallel to the base plate and to the working plate.

19. The cart of claim 1, wherein the holder includes a respective holding clip on end sides on both sides, with which the holder is secured on corresponding struts.

20. The cart of claim 19, wherein the holding clips each include two half shells which are connected to each other by a joint, and
   wherein the half shells together enclose the corresponding struts in a manner bearing there against on an outer circumferential side.

21. The cart of claim 20, wherein the joint is formed by a film hinge.

22. The cart of claim 1, wherein the holder includes a respective shelf on the end sides, and wherein the respective shelf is designed congruently with respect to a profile of corresponding strut and is supported on the strut.

23. The cart of claim 1, wherein the holder includes receiving devices for cleaning utensils.

24. The cart of claim 23, wherein the receiving devices are connected in a frictional and/or form-fitting manner to the holder.

25. The cart of claim 23, wherein the receiving devices are of hook-shaped design.

26. The cart of claim 1, wherein the holder and/or holding clips, included on end sides of the holder on both sides, and/or receiving devices, included on the holder for cleaning utensils, include a polymeric material.

27. The cart of claim 2, wherein the first fastening region includes a first area and the second fastening region includes a second area, and
wherein the second area is smaller than the first area.

28. The cart of claim 2, wherein the first end-side ends of the struts are at a first distance from each other, and
wherein the second end-side ends of the struts are at a second distance, and
wherein the second distance is smaller than the first distance.

29. The cart of claim 1, wherein the base plate is designed the same size as the working plate, viewed perpendicular to a main travel direction of the cleaning cart.

30. The cart of claim 1, wherein the working plate is designed to be larger than the base plate, viewed perpendicular to a main travel direction of the cleaning cart.

31. The cart of claim 1, wherein the working plate is designed to be the same size as the base plate, viewed perpendicular to a main travel direction of the cleaning cart.

32. The cart of claim 2, wherein a relatively smaller second fastening region together with an outer boundary of a relatively larger working plate bounds a depositing area for cleaning utensils.

33. A cleaning cart, comprising:
a base plate;
a working plate arranged at a vertical distance above the base plate; and
a linkage connecting the base plate to the working plate, the linkage disposed within the vertical distance,
wherein the linkage includes a first and a second strut, extending in a non-parallel manner with respect to each other,
wherein the first and second struts are connected to each other by a rack-shaped holder, and
wherein the holder is arranged in a self-locking manner between the first and second struts,
wherein the struts are in each case connected at a first end-side end to a first fastening region of the base plate and in each case at a second end-side end to a second fastening region of the working plate,
wherein the first fastening region includes a first area and the second fastening region includes a second area, and
wherein the first area is smaller than the second area.

34. A cleaning cart, comprising:
a base plate;
a working plate arranged at a vertical distance above the base plate; and
a linkage connecting the base plate to the working plate, the linkage disposed within the vertical distance,
wherein the linkage includes a first and a second strut, extending in a non-parallel manner with respect to each other,
wherein the first and second struts are connected to each other by a rack-shaped holder, and
wherein the holder is arranged in a self-locking manner between the first and second struts, and
wherein the holder includes a respective holding clip on end sides on both sides, with which the holder is secured on corresponding struts.

* * * * *